(12) United States Patent
Sugiyama

(10) Patent No.: US 8,914,745 B2
(45) Date of Patent: ***Dec. 16, 2014

(54) PORTABLE TERMINAL AND DISPLAY DATA EDITING METHOD FOR THE SAME

(75) Inventor: Minoru Sugiyama, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 603 days.

This patent is subject to a terminal disclaimer.

(21) Appl. No.: 13/244,390

(22) Filed: Sep. 24, 2011

(65) Prior Publication Data

US 2012/0017160 A1    Jan. 19, 2012

Related U.S. Application Data

(63) Continuation of application No. 11/261,610, filed on Oct. 31, 2005, now Pat. No. 8,060,838.

(30) Foreign Application Priority Data

Nov. 1, 2004   (JP) ................................ 2004-318523

(51) Int. Cl.
  G06F 3/048   (2013.01)
  G06F 9/44    (2006.01)
  H04M 1/725   (2006.01)

(52) U.S. Cl.
  CPC ......... *H04M 1/72583* (2013.01); *G06F 9/4443* (2013.01)
  USPC .......................................... 715/810; 715/864

(58) Field of Classification Search
  CPC .................................................... G06F 3/0482
  USPC ................................. 715/810, 864
  See application file for complete search history.

(56) References Cited

U.S. PATENT DOCUMENTS

| | | | |
|---|---|---|---|
| 5,892,475 A | 4/1999 | Palatsi | |
| 6,049,335 A | 4/2000 | Iida | |
| 6,411,822 B1 | 6/2002 | Kraft | |
| 7,409,411 B2 | 8/2008 | Sato | |
| 2004/0207766 A1 | 10/2004 | Sata et al. | |
| 2004/0221241 A1 | 11/2004 | Kim | |
| 2004/0267793 A1 | 12/2004 | Sato | |
| 2005/0071771 A1 | 3/2005 | Nagasawa et al. | |
| 2005/0143135 A1 | 6/2005 | Brems et al. | |

FOREIGN PATENT DOCUMENTS

| | | |
|---|---|---|
| CN | 1420699 A | 5/2003 |
| EP | 0192927 A2 | 9/1986 |
| EP | 0465149 A2 | 1/1992 |
| EP | 0744703 A2 | 11/1996 |
| EP | 0851346 A2 | 7/1998 |
| EP | 1300760 A2 | 4/2003 |
| JP | 8-241331 A | 9/1996 |
| JP | 8-263190 A | 10/1996 |

(Continued)

*Primary Examiner* — Omar Abdul-Ali
(74) *Attorney, Agent, or Firm* — Sughrue Mion, PLLC

(57) ABSTRACT

The present invention is a portable terminal and a display data editing method for the same capable of easily changing preliminarily stored display data to any expression preferable to the user. A display processor 3e1 controls the writing and read-out data in and out of a memory unit 5, and provides various displays on a display part 4 according to registered display data. An editing processor 3c edits the display data on a display and also collectively edits duplicated display data in response to key operation in a key entry unit 3c. A retrieving processor 3e3 retrieves any duplicated display data in the editing subject display data before change and after change.

2 Claims, 17 Drawing Sheets

(56) References Cited

FOREIGN PATENT DOCUMENTS

| | | |
|---|---|---|
| JP | 10-243079 A | 9/1998 |
| JP | 11-168540 A | 6/1999 |
| JP | 2000-112612 A | 4/2000 |
| JP | 2003-5883 A | 1/2003 |
| JP | 2003-22184 A | 1/2003 |
| JP | 2003-50867 A | 2/2003 |
| JP | 3529880 B2 | 3/2004 |

PORTABLE TERMINAL AND DISPLAY DATA EDITING METHOD FOR THE SAME

CROSS REFERENCE TO RELATED APPLICATION

This application is a continuation application of U.S. application Ser. No. 11/261,610 filed Oct. 31, 2005, which claims priority from Japanese Patent Application No. 2004-318523 filed Nov. 1, 2004, which applications are incorporated herein by reference

FIELD OF THE INVENTION

This invention relates to a portable terminal and, more particularly, to a portable terminal such as a portable telephone set and a display data editing method for the same, which permit changing display data.

BACKGROUND OF THE INVENTION

A prior art portable terminal has functions to permit various settings on a menu display or the like depending on a plurality of display items. Display data on a display screen for function settings or the like are preliminarily fixedly registered by the manufacturer. The user does such operations as various settings, communications, mail transmissions and receptions, etc., based on the display items.

Up to date, a portable terminal constitutes apart of fashion and living, and users who set waiting displays, call signals with melodies, etc. to suit their own taste in addition to decoration of the exteriors of their portable terminals, are increasing.

A portable terminal is known to set a menu display by down-loading graphic user interfaces corresponding to the user's tastes or purposes of use from a menu display providing server via internet (See Japanese patent publication, JP2003-5883A1).

Functions provided by portable terminals are ever increase and are approaching to those of PCs. Correspondingly, the number of displays is increasing, and the quantity of display data is becoming enormous. Despite such circumstances, display characters are held to the least necessary number due to limitation disposed on the display screen size by size reduction of the portable terminal. Furthermore, there arise undesired situations that it is difficult to understand contents or meanings of display data because display data for particular functions appear in a plurality of different displays.

In the portable terminal disclosed in the above patent publication, although it is possible to change the menu display by down-loading a substitute display via internet, the user can not easily change the display data by the unit of display data or the like or edit the data as desired.

Accordingly, it can improve convenience and enhance ease of use of such portable wireless terminal if the user can change display data of display items on various displays to expressions readily understandable by the use. Also, in the case that the user can change the display data, from the consideration of the possibility of duplication due to limitation imposed on the number of characters, it is preferable such that the user can easily confirm the duplication of all displays in a short time.

SUMMARY OF THE INVENTION

It is therefore a primary object of the present invention to provide a portable terminal and a display data editing method for the same, in which display items on the display can be changed to user's own representation.

Another object of the present invention is to provide a portable terminal and a display data editing method for the same, in which display data of the display items displayed on the display screen of the portable terminal can be freely changed as subject dealt with, for instance can be made to representations readily understandable by the user so as to improve readiness of use and to be friendly to the user.

A further object of the present invention is to provide a portable terminal and a display data editing method for the same, in which at the time of display data change a check can be made as to the same display data used in other displays (duplication check), thereby easily permitting unification of display items.

An aspect of the present invention is a portable terminal comprising a display unit for providing displays, a memory unit for storing display data including editable display data, a key entry unit for entering display data, a display processor for providing displays to the display unit by writing display data in and reading out the same from the memory unit and an editing processor for changing display data on the display unit for each display with display data entered from the key entry unit.

In the portable terminal, it is preferable that the display processor has a switching function to switch the display data on the display to an editing display with a cursor for changing, and the editing processor has an editing function to change the display data at the cursor position on the editing display in response to an operation of the key entry unit.

Preferably, the portable terminal further comprises a retrieving processor for retrieving the same display data as editing subject display data before change, and the editing processor collectively changes the same display data retrieved for in the retrieval processor together with the editing subject display data before change.

It is also preferable that the display processor has a display function to provide a retrieving result of the display data before change containing display specifying data specifying a display containing the same display data found as a result of retrieving in the retrieval processor and permitting changing of the same display data by selection from the key entry unit, and the editing processor has a function to change the same display data on the display selected with the retrieving result of the display data before change.

In the portable terminal, it is also preferable that the display processor has a display shifting function to shift the display to a pertinent display with selection of the display specifying data on the retrieving result of the display data before change.

Moreover, it is preferable that the retrieving processor has a retrieving function to retrieve the same display data as the display data after change, and the editing processing part has a collectively changing function for collectively changing the display data containing the same display data as the display data after change retrieved in the retrieving processor together with the display data before change.

It is preferable in the portable terminal that the display processor has a display function to provide a retrieving result display of the display data after change containing display specifying data, which specifies a display containing the same display data as the retrieving result in the retrieving processor and is capable of setting the changing of the same display data with selection in the key entry unit, and the editing processor has a function to change the same display data on the display selected with the retrieving result display of the display data after change.

It is also preferable in the portable terminal that the display processor has a display shifting function to shift the display to a pertinent display with selection of the display specifying data on the retrieving result display of the display data after change.

It is preferable in the portable terminal that the memory unit stores subordinate data relevant to the display data and including at least limited number of characters and font data, the display processor provides display data according to the subordinate data, and the editing processor edits editing subject display data according to the subordinate data.

It is also preferable in the portable terminal that the display specifying data is the data for operation procedure from a waiting display preliminarily registered as the subordinate data of the display data till a display containing the display data.

Finally, it is preferable in the portable terminal that the display containing the editing subject display data is a function set-up menu display for the portable terminal.

Another aspect of the present invention is a display data editing method for a portable terminal capable of providing different displays to a display unit according to display data stored in a memory unit, comprising the steps of switching a given display to an editing display, changing the display data on the editing display with operation of a key entry unit, and storing the changed display data in the memory unit.

In the display data editing method for a portable terminal, it is preferable to further comprise the steps of providing a cursor display for the editing subject display data on the editing display, and changing the display data at the cursor position.

Preferably, the display data editing method for a portable terminal further comprises the steps of retrieving the same display data as the editing subject display data before change in the display data and collectively changing the same data together with the editing subject of the display data before change.

Preferably, the display data editing method for a portable terminal further comprises the steps of providing a retrieval result display of the display data before change containing display specifying data, the display specifying data being a data specifying a display containing the same display data as a result of retrieving and capable of setting the changing of the same display data with selection in the key entry unit, and changing the same display data on the display selected with the retrieving result display before change.

It is preferable in the display data editing method for a portable terminal that changing to the display can be made with selection of the display specifying data on the retrieving specifying display before change.

Preferably, the display data editing method for a portable terminal further comprises the steps of retrieving the same display data as the display data after change, and collectively changing the display data containing the same display data as the retrieved display data after change together with the display data before change.

It is preferable that the display data editing method for a portable terminal further comprising the steps of providing a retrieving result display after change containing display specifying data, the display specifying data being data specifying a display containing the same display data as a result of retrieving and capable of set-up the changing of the same display data with selection in the key entry unit, and changing the same display data on the display selected with the retrieval result display after change.

It is preferable in the display data editing method for a portable terminal that the selection of the display specifying information on the retrieving result display after change enables to switch to the applicable display.

It is preferable in the display data editing method for a portable terminal that the memory unit stores subordinate data relating to the display data including at least the limited number of characters and font data, displaying the display data according to the subordinate data, and editing the subject display data according to the subordinate data.

It is preferable in the display data editing method for a portable terminal that the display specifying data is data of operation procedure from a waiting display preliminarily registered as subordinate data to the display data till a display including the display data.

It is preferable in the display data editing method for a portable terminal that the display containing the editing subject display data is a menu display of function set-up in the portable terminal.

According to the present invention, the portable terminal permits the user to freely change display data on preliminarily registered displays, thus permitting its readiness of use.

Particularly, display items which are independently editable for individual displays, can be suitably changed to suitable representations, and thus they can be suitably changed in conformity to the frequency and states of user's use concerning the functions of the portable terminal.

For the display data change, all the display data possessed by the portable terminal are retrieved for duplication check, the check results are displayed as a list on the display screen, from which a setting is made, without interruption of the editing, as to whether pertinent display data on displays including duplicate display data are to be substituted for. Thus, it is possible to substitute for the same data selectively and correctively, thus permitting simply changing of data free from discrepant representations at a time.

Also, with such an arrangement that duplication checks are made on the changed display data as well, it is possible to cancel changed display data, thereby avoiding inconvenience.

According to the invention, changes to representations for children without use of Chinese characters, localism representations such as local language versions, foreign language representations, etc., can be readily made depending on the user's age, nationality, district of residence, etc. of the portable terminal.

Moreover, with such an arrangement that display data having been edited on the portable terminal can be transferred to other portable terminals via interface (e.g., USB, IrDA, Bluetooth, etc.) possessed by the portable terminal, mail, etc., it is possible to permit effective utilization of edited display data and cope with collections or the like of display data transferred from any other portable terminal.

BRIEF DESCRIPTION OF THE DRAWINGS

In the accompanying drawings.

DESCRIPTION OF PREFERRED EMBODIMENTS

First Embodiment

Now, embodiments of the present invention will be described hereunder in greater detail by reference to the accompanying drawings.

Figure 1:
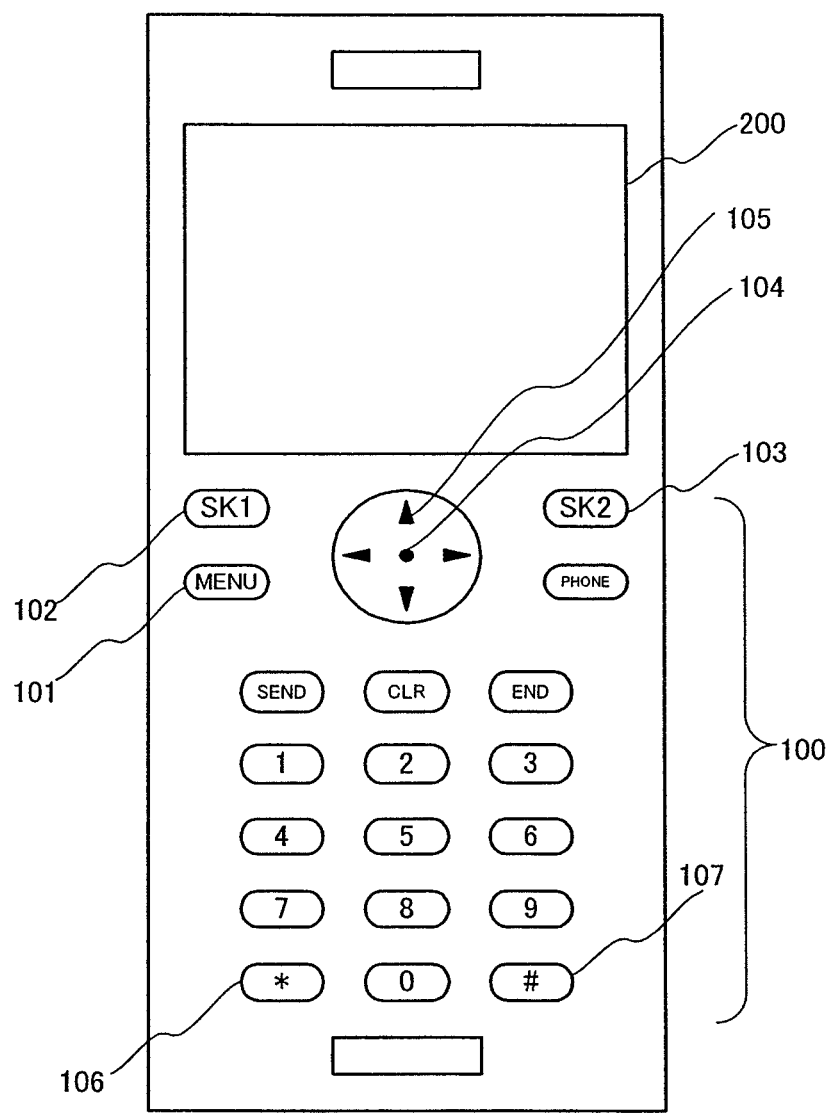
FIG. 1 is an outer view of a portable terminal according to an embodiment of the present invention.

FIG. 1 shows an outer appearance of a portable terminal according to an embodiment of the present invention. The portable terminal has on the outside a key input unit 100 with a keyboard having keys, push buttons, etc. for various key input operations, a display unit 200 having a liquid crystal display screen for providing various displays (i.e., function displays), a microphone, a loudspeaker, etc. The key input unit 100 serves to control the functions of the embodiment of the portable terminal, and it includes a "Menu" key 101 for starting a menu function, an SK1 key 102 disposed at a position corresponding to a guide display (i.e., a lower left position) on the display screen for designating the operation of guide contents, such as display data change, an SK2 key 103 for likewise designating the operation of guide contents of a guide display (a lower right), such as confirmation (or execution), a ● key 104 for starting a predetermined function such as display switching, a * key 106 and a # key 107, and ▲ and ▼ keys for selecting a display item or the like as well as shifting a cursor.

Figure 2:
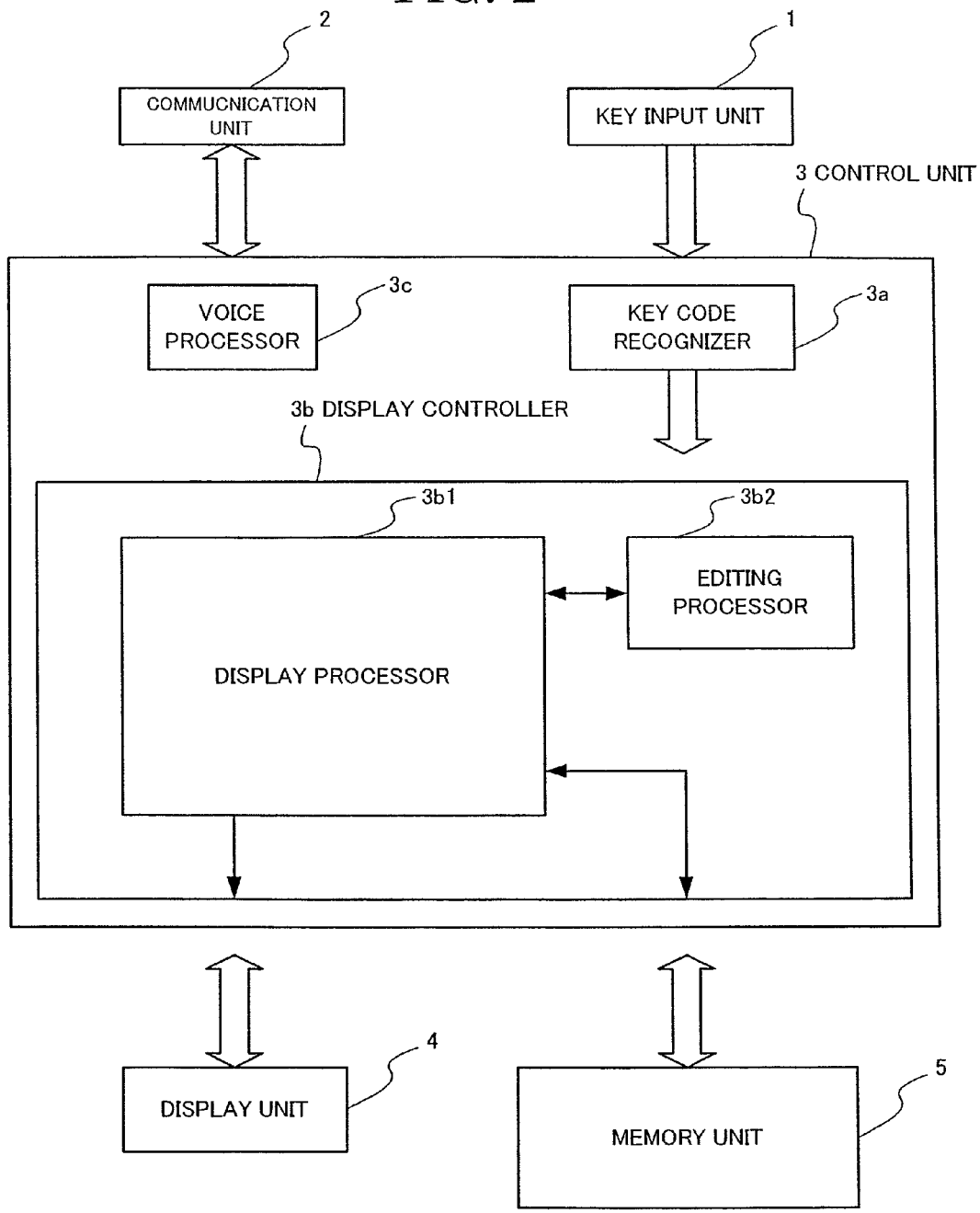
FIG. 2 is a functional block diagram of the portable terminal according to the present invention.

FIG. 2 is a functional block diagram of the portable terminal. Reference numeral 1 designates a key input unit for receiving key inputs from keys provided in the portable terminal. Reference numeral 2 designates a communication unit having a microphone and a loudspeaker for inputting and outputting voice data. Reference numeral 3 designates a control unit for controlling the portable terminal as a whole. Reference numeral 4 designates a display unit for providing various displays concerning communication of the portable terminal, and also providing various function displays on the basis of preliminarily registered operation routines for providing various function displays, and further providing displays for changing data in an editing routine. Reference numeral 5 designates a memory unit including a memory or the like for storing display data including editable display data (referred to as "display data") such as text data to be provided on the display and also other various data such as pertinent data to be described hereinafter.

The control unit 3 has a key code recognizer 3a, a display controller 3b for controlling displaying, editing, etc. according to the invention, and a voice processing part 3c. The display controller 3b has a display processor 3b1 for executing display control necessary for controlling the editing and so forth according to the invention, and an editing processor 3b2 started on each display for editing such display data as text data provided on the display screen.

Now, the functions of the display controller 3b in this embodiment will be described in greater detail.

The display processor 3b1 has a function of providing waiting displays of various functions corresponding to normal transmission and reception, function setting, etc. and also communication displays for transmission and reception, communication, etc. In addition, the display processor 3b1 has functions display control functions of providing such display data as menu display (i.e., main menu display), various displays such as various selection displays (i.e. menu displays) subordinate to the main display, editing displays with cursor as editing mode concerning display data on pertinent function displays, editing history displays, after-change displays after display data changes in editing and outputting these display data in switching as desired, for display provision by the display unit 4.

The display processor 3b1 is utilized in an image data producing routine for reading out image data and pertinent data thereto preliminarily stored in the memory unit 5 and executing the above mentioned display. Also, the display processor 3b1 has functions of storing, in editing set-up state, display data of function displays after editing in the memory unit 5 and executing a registration routine.

The display data stored in the memory unit 5 includes, as a series of image data concerning the menu display, the main menu display and individual layer selection displays in hierarchical structure of a selection branch started from a pertinent display, and also includes data associated with text data such as the number of characters and fonts of display items on individual selection displays.

The display processor 3b1 has a function of registering display data change on the editing display in the memory unit 5 in a user's decision operation and a function of provisionally setting and displaying the display data change until the registration.

Figure 3:
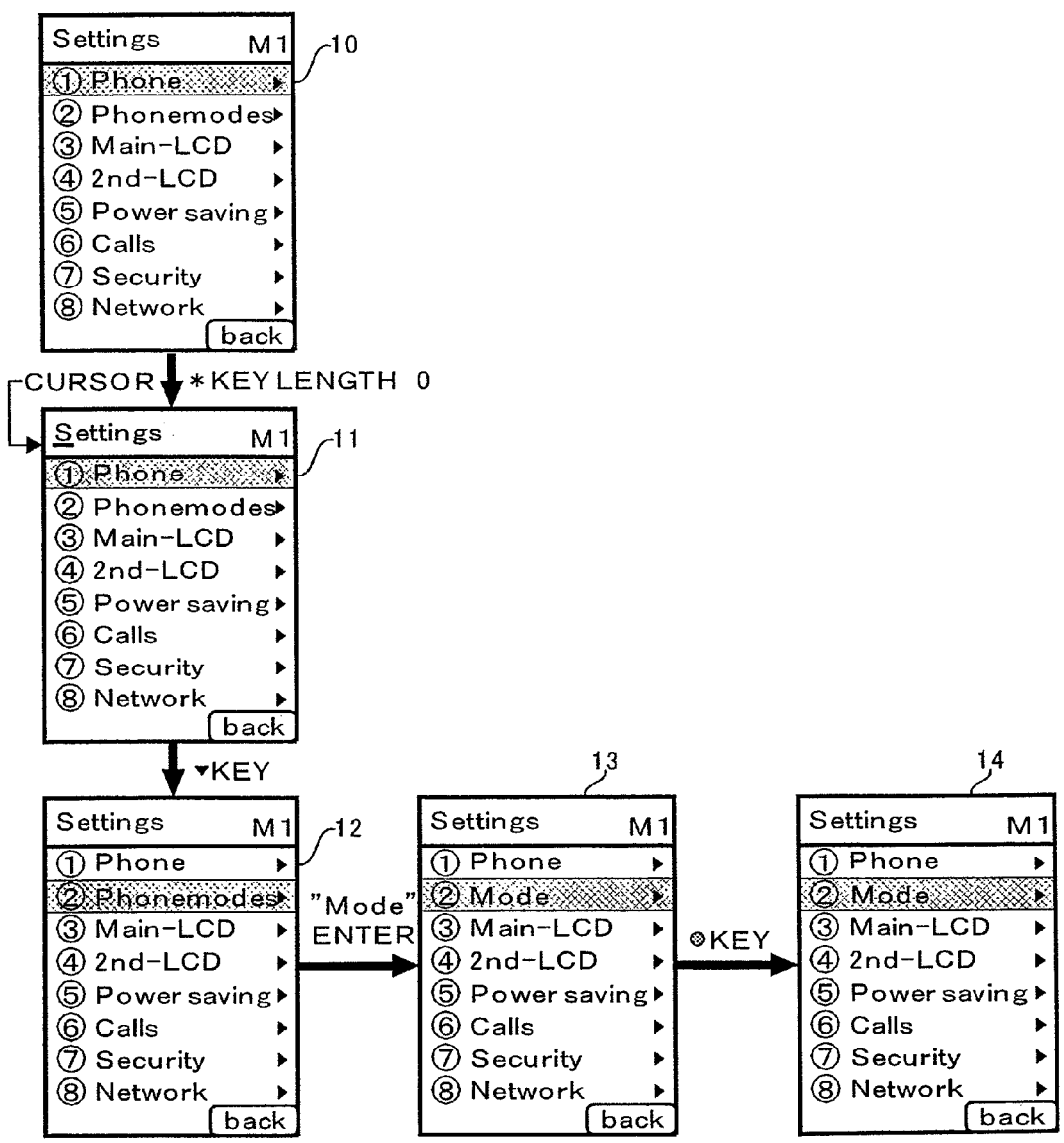
FIG. 3 shows an example of displays provided in the first embodiment of the present invention.

FIG. 3 shows an example of practical displays in a first embodiment. This example concerns an operation of changing display data of selection items on the menu display. Display 10 is a set-up display provided at the time of depression, in the waiting display, of the "MENU" key 101. The display 10 contains various display data (such as "Settings", "Phone" and "Phone nodes". "Setting" is a title representing the kind of set-up items on the display; for example "Phone" is a selection item directed to the telephone function and "Phone mode" is selection items directed to communication, transmission/reception, etc. Usually, individual selected items and also selected displays of detailed selection items having titles representing individual display data are developed on the display screen. Symbol "M1" at the right upper position on the display screen is a display specifying information and indicates a display at the time of selecting "Phone" subsequent to the depression of the "MENU" key 101 in the waiting display. That is, the symbol indicates the operation routine for operating keys in the waiting display for providing the pertinent display.

With the display 10, by depressing the * key 106 for an extended time (long depression), the editing function for editing the display data is initiated and an initial stage display for editing function 11 is displayed. A judgment can be made whether the editing function is initiated or not by presence/absence of a cursor on the display 11.

On the display 11, the cursor position can be appropriately moved to the desired direction by the ▲ or ▼ key 105. A display that appears when the cursor is moved to "Phone modes" desired to be edited is an editing function display 12, on which the selected item is displayed on a mesh or the like.

In this particular example, the display data "Phone modes" before changing is changed to "Mode". "Mode" is entered in alphabet from the key input unit 1 for setting up to a display 13 after data entry. After confirming that the display content of the display 13 has no problem, a ● key 104 is depressed to execute a confirmation routine for registering the change in the text data.

Similarly, with various displays, by specifying the subject to be edited (i.e., display item) with the cursor after switching to the edition display and changing the individual display data with text input from the key input unit 1 and depressing the ● key 104, it is possible to change display items as desired.

Now, the operation routines in the portable terminal and the display data editing method for the same embodying the present invention will be described with reference to flow-charts.

Figure 4:
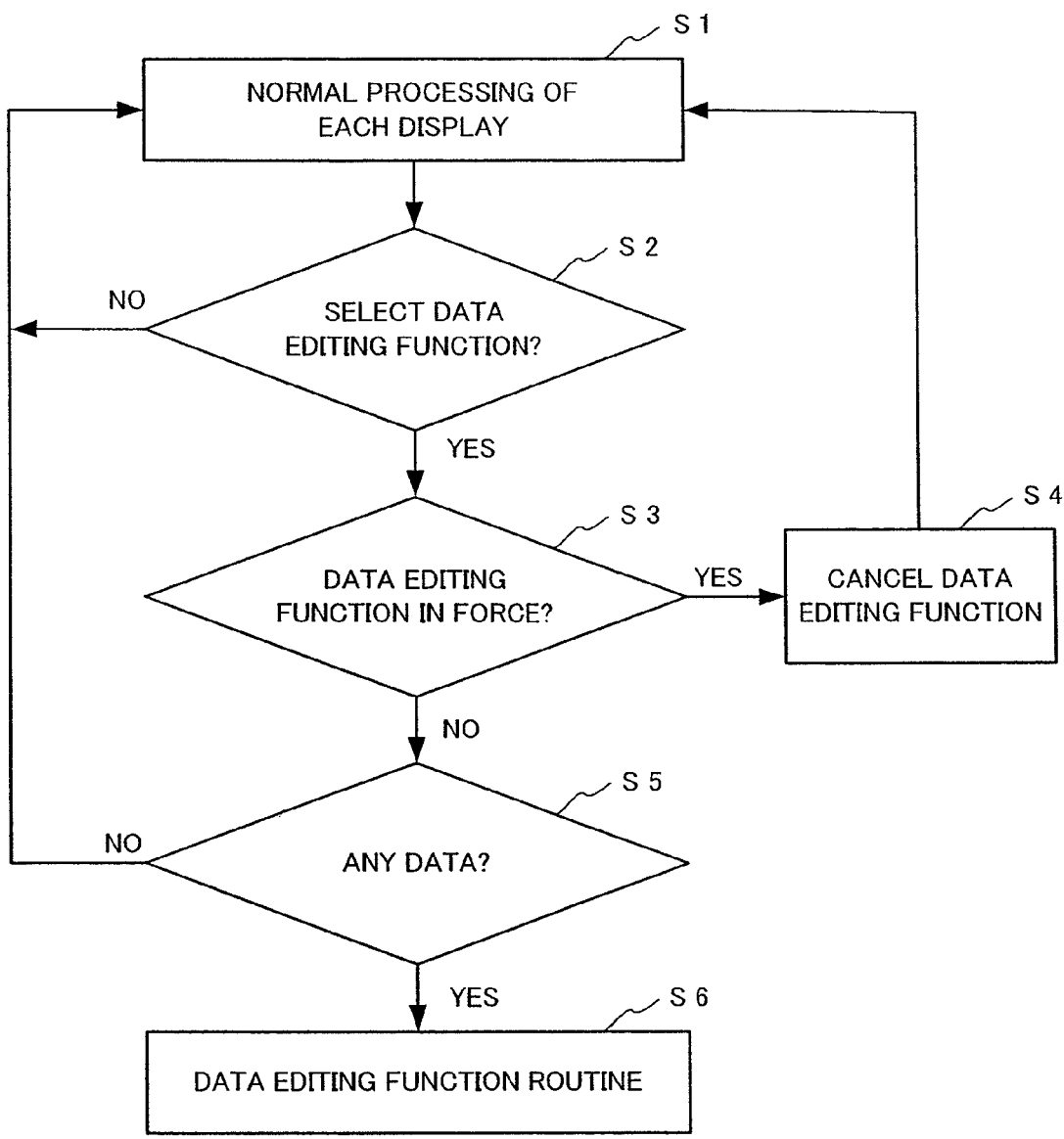
FIG. 4 is a flowchart illustrating a data editing function start routine.
Figure 5:
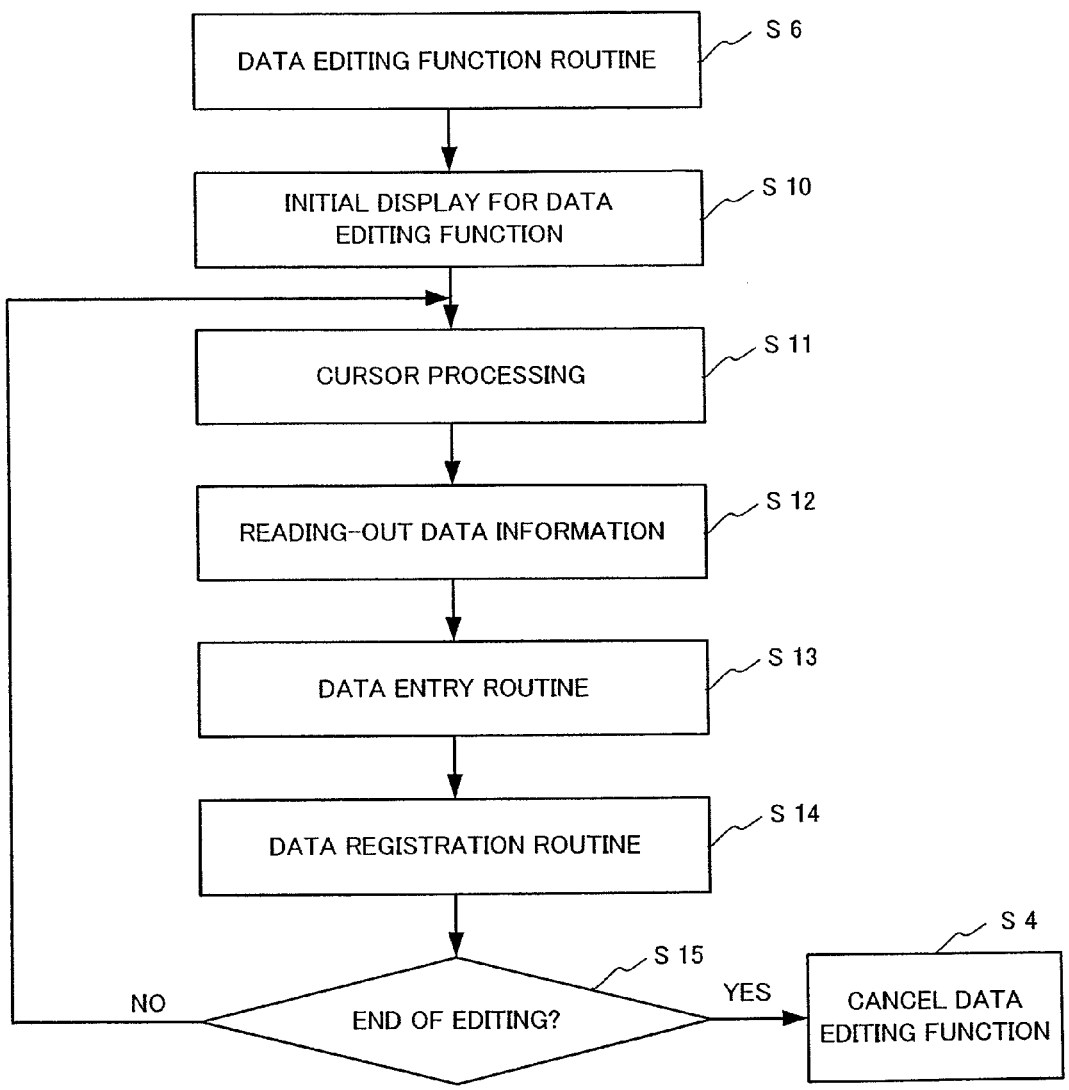
FIG. 5 is a flowchart illustrating a data input/editing function routine.
Figure 6:
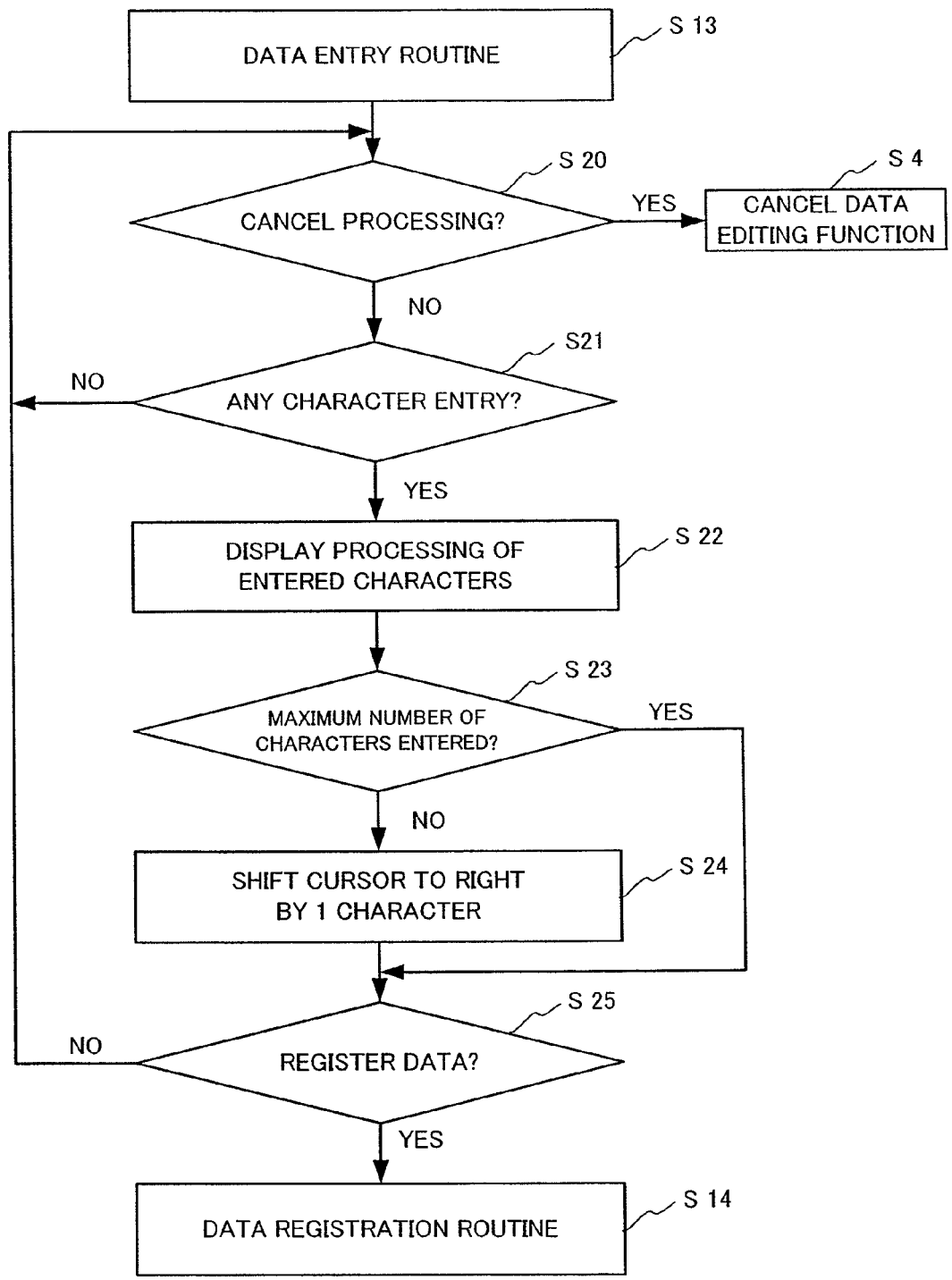
FIG. 6 is a flowchart illustrating a data input/registration routine in data editing.

FIG. 4 is a flow chart illustrating a start-up routine for data editing function. FIG. 5 is a flowchart illustrating a data input-editing function routine. FIG. 6 is a flowchart illustrating a data entry/registration routine in data editing.

In the start-up routine as shown in FIG. 4, with any display (step S1) provided in the portable terminal, a check is always made (step S2) to see if the * key for starting the editing function has been depressed for an extended time. When the * key has been depressed for an extended time, a check is made to see if the data editing function is in force (step S3). If the data editing function is found to have been started, the editing function is cancelled to terminate the routine (step S4) and the normal display is restored (step S1). If it is found in step S3 that the editing function failed to start, a check is made to see any display data is present on the display (step S5). If no display data is found, the normal display is restored (step S1). If any display data is present, the routine goes to the data editing function routine in FIG. 5 (step S6).

In the data editing routine as shown in FIG. 5, a data editing function initial stage display such as the display 11 (FIG. 3) appears (step S10). The fact that the editing function is in the starting state is shown by providing a cursor to the display data as shown on the display 11 (step S11). Since the cursor display is also found in the normal display, a cursor of different color from that in the normal display is used so that it can be readily distinguished by the user. In the case of selecting display data that the user desired for editing by the ▲ or ▼ key operation, the cursor is shifted to display data corresponding to the pertinent key operation (step S11). As shown in the display 12, read-out are such data as the font size and the maximum number of characters to be entered pertinent to the display data with cursor or operation routines from the waiting display as registered display specifying data (step S12). On the display 10, the operation procedure information is the "M1" display information in the upper right part on the display. "M" means depression of the "MENU" key; more specifically it means that the display 10 appears by depressing the "MENU" key on the waiting display and then depressing the "1" key. After reading out the pertinent information to the display data (step S12), the routine goes to a data entry routine as shown in FIG. 6 (step S13).

In the data entry routine as shown in FIG. 6, a check is made to see if the * key for canceling the editing function has been depressed for an extended time (step S20). If the * key has been depressed for an extended time, the editing routine is terminated and the display 10 is restored (step S4). Otherwise, it goes to the character entry waiting step (step S21). If any character is entered, the entered character (or characters) is displayed at the cursor position (step S22), and a check is made to see if the entered characters do not exceed the maximum number obtained in relation to the display data (step S23). If the entered characters do not exceed the maximum number, the cursor is shifted by one character to the right of the character where the cursor is inputted (step S24). If the entered characters have reached the maximum number, a check is made without cursor shift to see if the next entered key is the ● key for data registration (step S25). If the ● key for the data registration is depressed, the data registration routine is executed (step S14). After termination of the data registration routine, the routine goes back to the data editing function routine as shown in FIG. 5 for editing the next display data. At this time, the editing routine can be continued by making a check to see if the + key is depressed for an extended time to terminate the editing. If it is detected in step S15 that the * key has been depressed for an extended time in the step S15, the editing routine is terminated and the display 10 is restored (step S4).

In the above routine operations, it is possible to change independent display data on any display as desired by the user.

Second Embodiment

An example of changing display data used on a particular display with the editing function has been described in the above first embodiment. As a result of such editing, it is possible to make an error in the set-up operation due to lack of uniformity in the case that the same display data before change is used with a pertinent display or a related other display.

A second embodiment is arranged assuming that the same display data as editing subject display data having been edited with a particular display is used on a pertinent display or a different display. In this case, in a decision operation (depression of the ● key) after set-up of display data change, it is made possible to readily execute, without data entry by depression of any predetermined operation key, the intended change by automatically starting a display data retrieving routine and retrieving for the same display data before the registering operation. Alternatively, it is made possible to execute the intended change at a time by specifying one or more displays to be changed while confirming the prevailing display.

Figure 7:
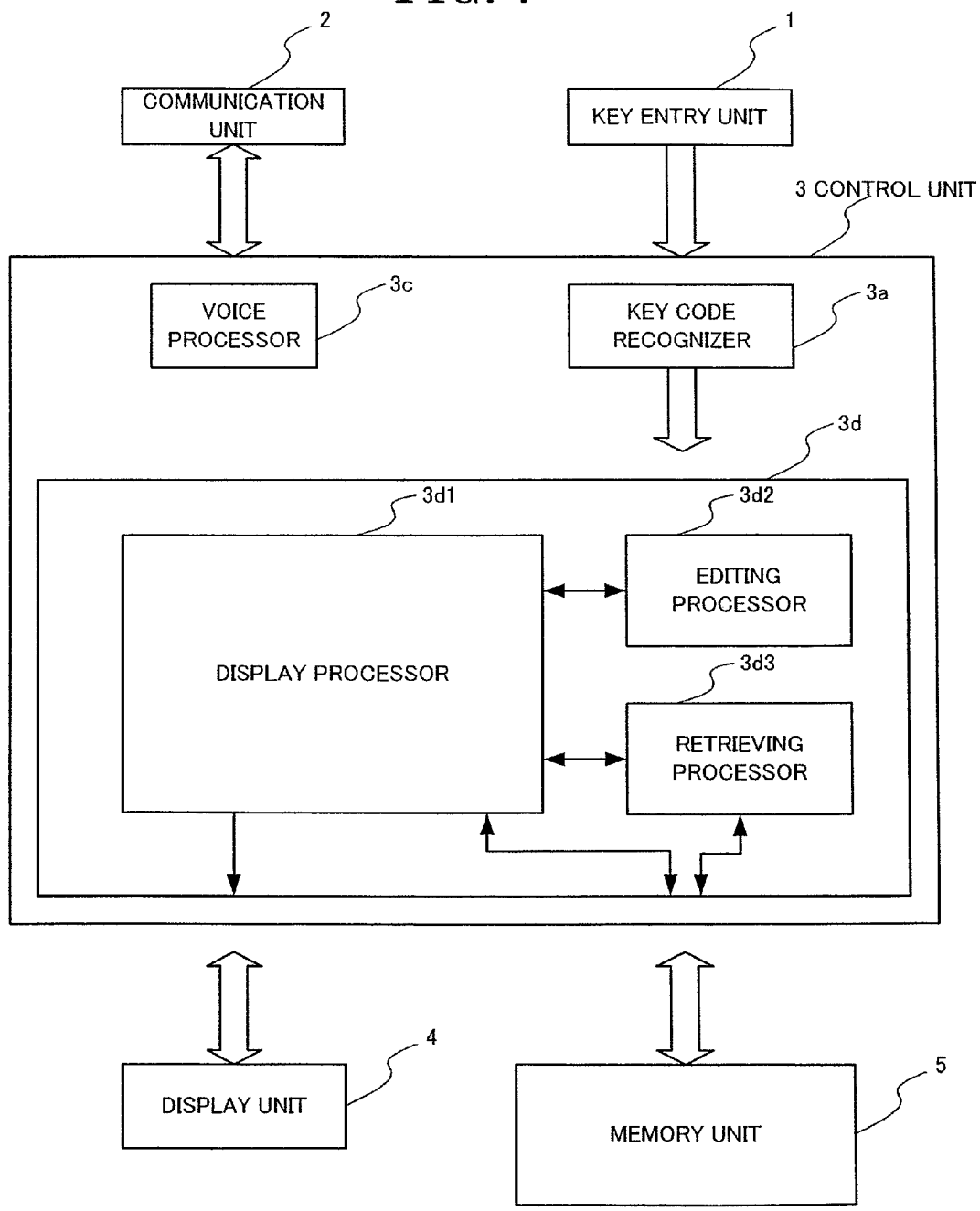
FIG. 7 is a functional block diagram of a second embodiment of the present invention.

FIG. 7 is a functional block diagram showing the second embodiment of the invention. The second embodiment has the following construction and functions in addition to the construction and functions of the first embodiment. More specifically, the display controller 3$d$ has a retrieving processor 3$d$3 in addition to the display processor 3$d$1 and the editing processor 3$d$2.

The retrieving processor 3$d$3 has functions performed in an interlocked relation to a user's key entry operation (depression of the ● key) for certifying the set-up of the display data change as shown in FIG. 3. Specifically, these functions are retrieving display data contained in a related display or the like from the data in the memory unit 5, specifying a display on which the same display data is retrieved are specified by the display specifying data (i.e., operation routine information such as M12 or the like) based on the retrieving result, and informing it to the display processor 3d1.

The display processor 3d1 has, in addition to the function of outputting display data as in the first embodiment, a function of providing a retrieving result display showing the display specifying data as a retrieval result display to the display unit 4 and a function of provisionally setting and showing display data change on the retrieving result display. Thus, the display data change is retained until its confirmation through the entire display that it is done as a display item collectively on other displays as well. In the case that the change went wrong or inconvenient, a user's registration canceling routine or the like is made possible. The part 3d1 further has a function, provided at the time of changing the same display data by user's selection, of delivering the same display data on the display to the editing processor 3d2. The editing processor 3d2 has a function of collectively changing the display data sent out of the display processor 3d1.

Figure 8:
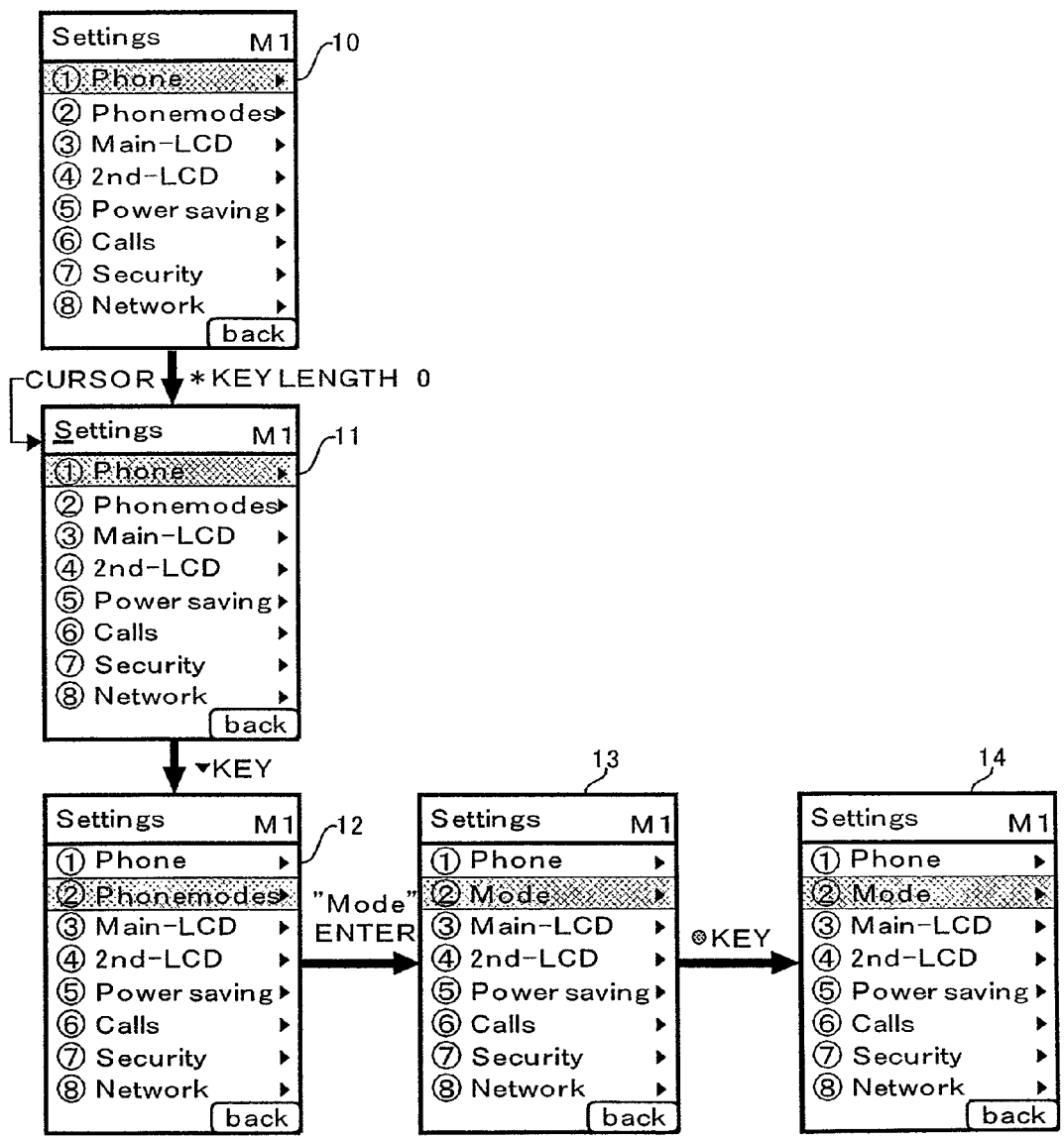
FIG. 8 shows displays provided in the case that no duplication is present in the display data before change is made.
Figure 9:
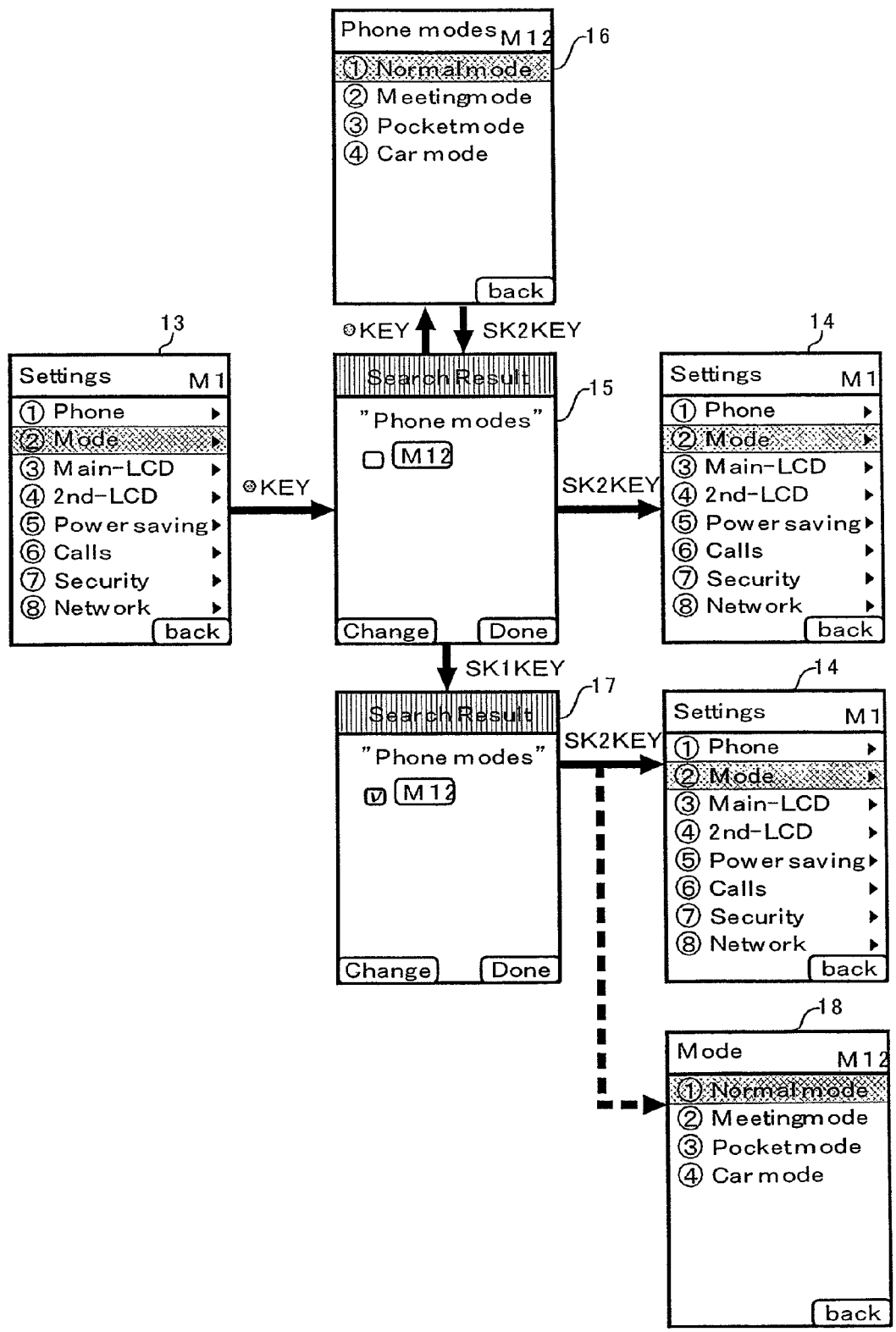
FIG. 9 shows displays provided in the case that the same display data is included as a result of retrieval.

FIGS. 8 and 9 are examples of featuring practical displays in the second embodiment. Specifically, they show display operations in the case of presence of duplicated display data in a duplication check at the time of display data check as in the first embodiment. In the display data retrieving routine, a duplication check is made on the display data before change. The data editing function is the same as that in the display data change as shown in FIG. 3. A display operation example of the display data duplication check before change will be described in connection with the presence or absence of "Phone modes".

FIG. 8 shows practical displays in data editing in the case free from any duplication in the display data before change. As shown in the FIG. 8, in the case free from data duplication in the display data before change, displayed is the same display 14 as in the first embodiment at the time of depression of the ● key. Again in the case, at the time of display data change a check is made by retrieving to see if other display data "Phase modes" has been used in duplication. Since there is no duplicated display data, the "Mode" entered in the display 13 is registered in substitution for the "Phone modes" registered in the memory unit 4, thereby displaying the data registration display 14 after the substitution.

FIG. 9 shows an example of practical displays in the case of presence of the same display data found as a result of retrieving. The result of the duplication check of the display data before change is shown as the data retrieval result display before change 15. Displayed on the display 15 is the display specifying data "M12" of display 16 that is extracted as the presence of the same display data found in the duplication check.

In the retrieving result display before change 15, change is made to confirm by switching to the display 16 that is specified by the "M12" by depressing the ● key 104. It can be understood that the above display data "Phone modes" before change is used in duplication as the title display data on the display 16. If the display specifying data of a plurality of displays (not shown) is displayed, the individual displays 16 appear selectively by shifting the cursor to the respective display specifying data with the ▲ or ▼ key.

After confirming that the "Phone modes" is shown on the display 16, the data retrieval result display before change 15 can be restored by depressing the SK2 key 103. Similarly, the SK1 "Change" key is depressed for chaining the display data "Phone modes" of the display 16 to the "Mode" on the display 15. By doing so, displayed is the data retrieving result set-up display 17 with a check mark to display specifying information of the display of the change setting.

In this case, a check mark is provided on a box on the left side of the display specifying data "M12" on the display data retrieving result set-up display 17. In this condition, a certifying routine is executed with the "Phone modes" of the display specifying data "M12" as a subject of substitution for the display data "Mode" as well as the "Phone mode" of the display specifying data "M1" as the present editing subject. In the certifying routine, the changing of the text data of change setting made at the time of depression of the SK2 "Done" key is registered in the memory unit 5.

Specifically, with the data retrieving result display before change 15, by depressing the SK2 "Done" key without providing any check mark to the box for the display specifying information "M12", as shown in the upper display 14 in FIG. 9, the "Phone modes" in the second line is changed to the "Mode", while the "Phone modes" on the display 16 of the display data specifying information before change M12 is not changed. With the data retrieving result display before change 15, by depressing the SK2 "Done" key after providing a check mark to the box for the display specifying data M12 (display 17), as shown in the lower displays 14 and 18 in FIG. 9, the "Phone modes" in the second line of the display specifying information M1 is changed to the "Mode", and the "Phone modes" of the display specifying information M12 is changed to the "Mode".

Now, the operation routines in the second embodiment of the portable terminal and the display data editing method for the portable terminal will be described with reference to flowcharts. In the second embodiment, since the data editing function start-up routine is the same as that in FIG. 4 for the first embodiment, description will be made with reference to the flowchart in FIG. 4.

Figure 10:
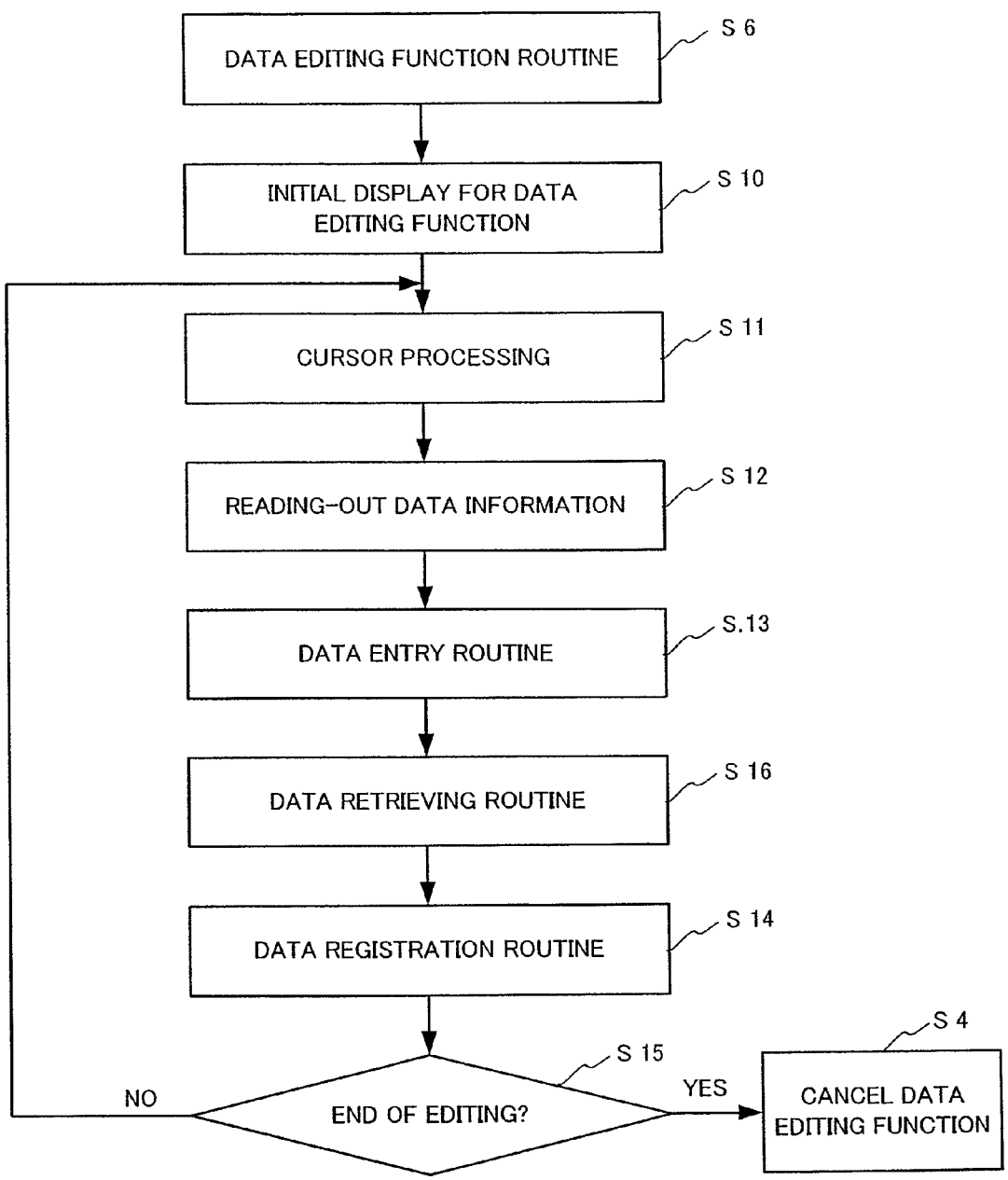
FIG. 10 is a flowchart illustrating a data input/editing function routine.
Figure 11:
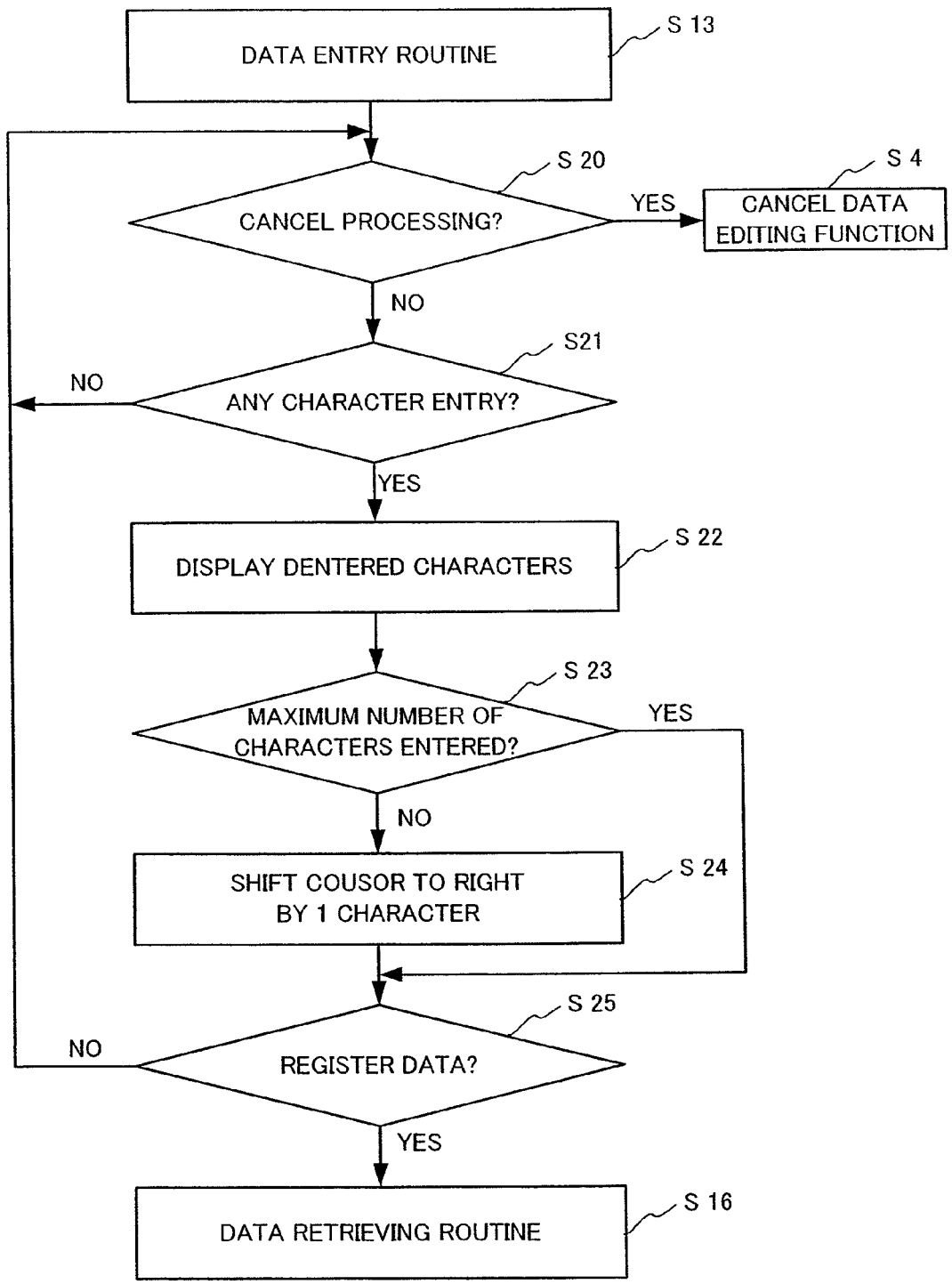
FIG. 11 is a flowchart illustrating data input in data editing.
Figure 12:
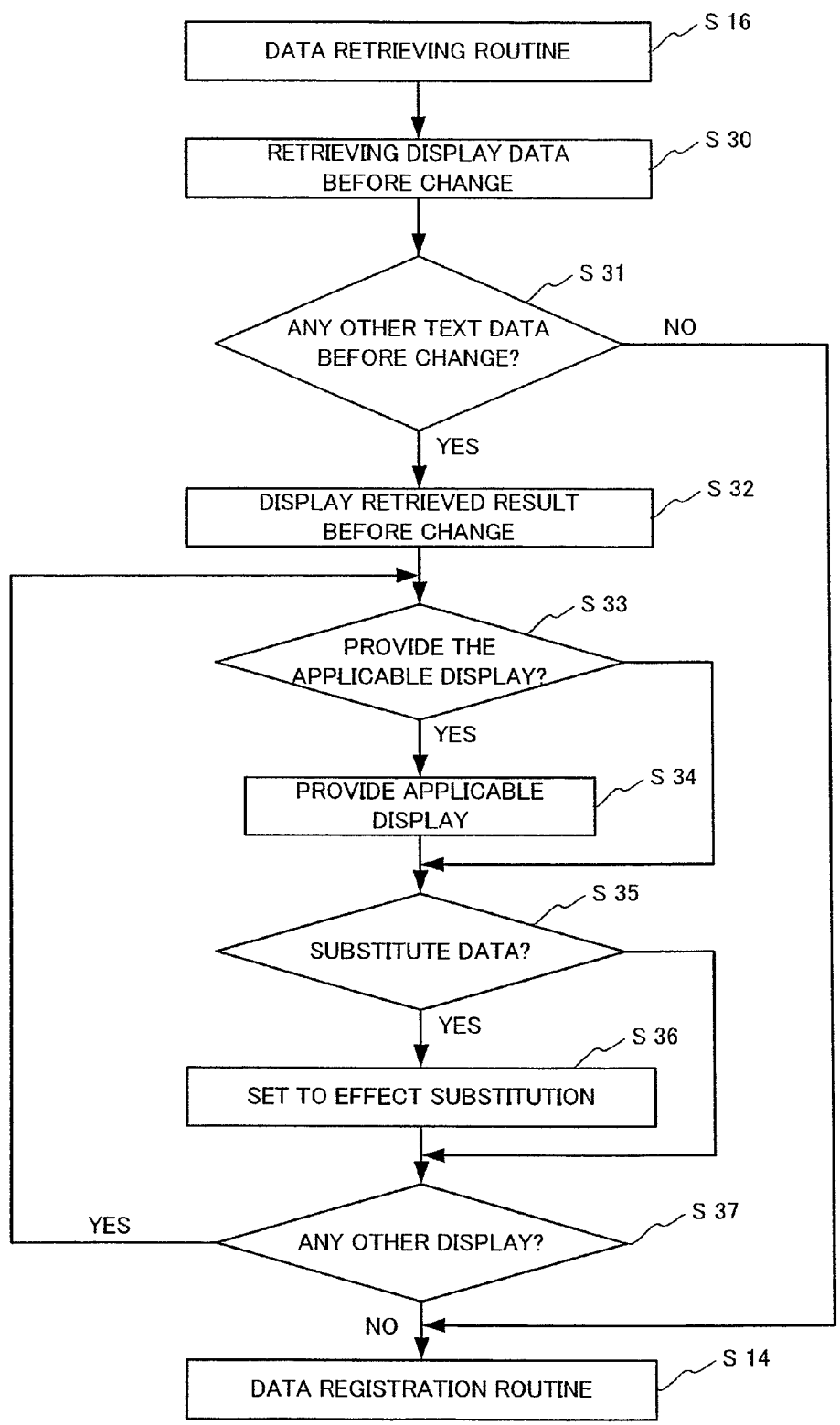
FIG. 12 is a flowchart illustrating a data retrieval and registration routine.

FIG. 10 is a flowchart showing a data entry/editing function routine. FIG. 11 is a flowchart showing data entry in data editing. FIG. 12 is a flowchart showing a data retrieving/registering routine.

In the data editing function start-up routine in the second embodiment, on a given display provided in the portable terminal (step S1 in FIG. 4), a check is made to see if the * key for initiating the editing function is depressed for an extended time (step S2 in FIG. 4). If the * key is depressed, a check is made to see if the editing function has been initiated (step S3 in FIG. 4). If the editing function has been initiated, the editing function is cancelled to terminate the routine (step S4 in FIG. 4) and the normal display is restored (step S1 in FIG. 4). If the editing function is not yet initiated, a check is made to see if any display data is present on the display (step S5 in FIG. 4). In the absence of any display data, the normal display is restored (step S1 in FIG. 4). In case of the presence of any display data, it goes to the data editing function routine as shown in FIG. 10 (see S6 in FIG. 4).

In the editing function routine as shown in FIG. 10, an editing function initial stage display such as the display 11 first appears (step S10). Whether the editing function is in force is shown by the cursor as in the display 11 (step S11). Similarly to the first embodiment, a different color cursor from that for the normal display is provided. If the user selects a display data desired to edit by operating the ▲ or ▼ key, the cursor is shifted to the display data in response to the key operation (step S11). Acquired is the font size or the maximum number of characters to be entered associated with the display data with cursor such as the display 12 or the display specifying information (e.g., M1, M12, etc.) (step S12). After reading out the information associated with the display data (step S12), it goes to the data entry routine as shown in FIG. 11 (step S13).

In the data entry routine as shown in FIG. 11 (step 13), a check is made to see if the * key for canceling the editing function is depressed for an extended time (step S20). If the * key is depressed for an extended time, the editing routine is terminated and the display 10 is restored. Otherwise, it goes to the character entry waiting mode (step S21). If any character is entered, check is made on the entered character at the cursor position (step S23). Unless the entered characters do not exceed the maximum number, the cursor is shifted by one character to the right of the cursor position (step S24). If the maximum number of characters have been entered, a check is made, without cursor shift, to see if the next entered is the ● key for data registration (step S25). If the ● key is depressed, it goes to the data retrieving routine in FIG. 12 (step S16).

In the data retrieving routine as shown in FIG. 12 (step 16), a retrieving routine for display data before change is executed (step S30). In the retrieving routine for display data before change, a duplication check is made to see if the display data before change is used on any other display (step S31).

In the absence of any data, there is no duplication in the display data before change and a substituting routine based on the data retrieving result after change is assumed to be the sole routine to be executed. In the data has been used, provided is the data retrieving result display before change such as display 15 (step S32). At this time, the cursor is shifted to the "M12" provided on the display 15 (step S33) and the * key is depressed to provide the display 16 for the purpose of confirmation during editing of the display 16 (step S34). After confirmation of displayed contents on the display 16, the display 15 is restored. In case of changing the data displayed on the display 16 to the same "Mode" as the display 15 (step S35), change set-up can be effected by depressing the SK1 "Change" key. The display that is set is the data retrieving result set-up display 17 (step S26). In the display 17, if there is any other subject display (step S37), the display is similarly set after confirmation. Subsequently, the data registration routine is executed by depressing the SK2 key "Done" (step S14).

After termination of the data registering routine, it returns to the data editing function routine as shown in FIG. 10 for editing the next display data. At this time, a check is made to see if the editing routine is terminated by depressing the * key for an extended time (step S15), thereby enabling to continue the editing routine. If it is detected that the * key is depressed for an extended time in step S15, the editing routine is terminated and the display 10 is restored (step S4).

In the above operation routine, it is possible to change, with a given display, the display data desired by the user collectively with duplication display data provided on a different display or the like.

Third Embodiment

The second embodiment described above is an example of changing display data on a particular display with data input and also changing the data collectively with the same display data on a different display or displays. However, the result of such editing may be the case that changed display data is used on the pertinent display or a different display relevant thereto. This means lack of uniformity, leading to such possibility as erroneous set-up operation. Also, the first change (i.e., change of the "Phone mode" to the "Mode") may be inadequate. Accordingly, in a third embodiment a duplication check of changed display data is made as well.

Figure 13:
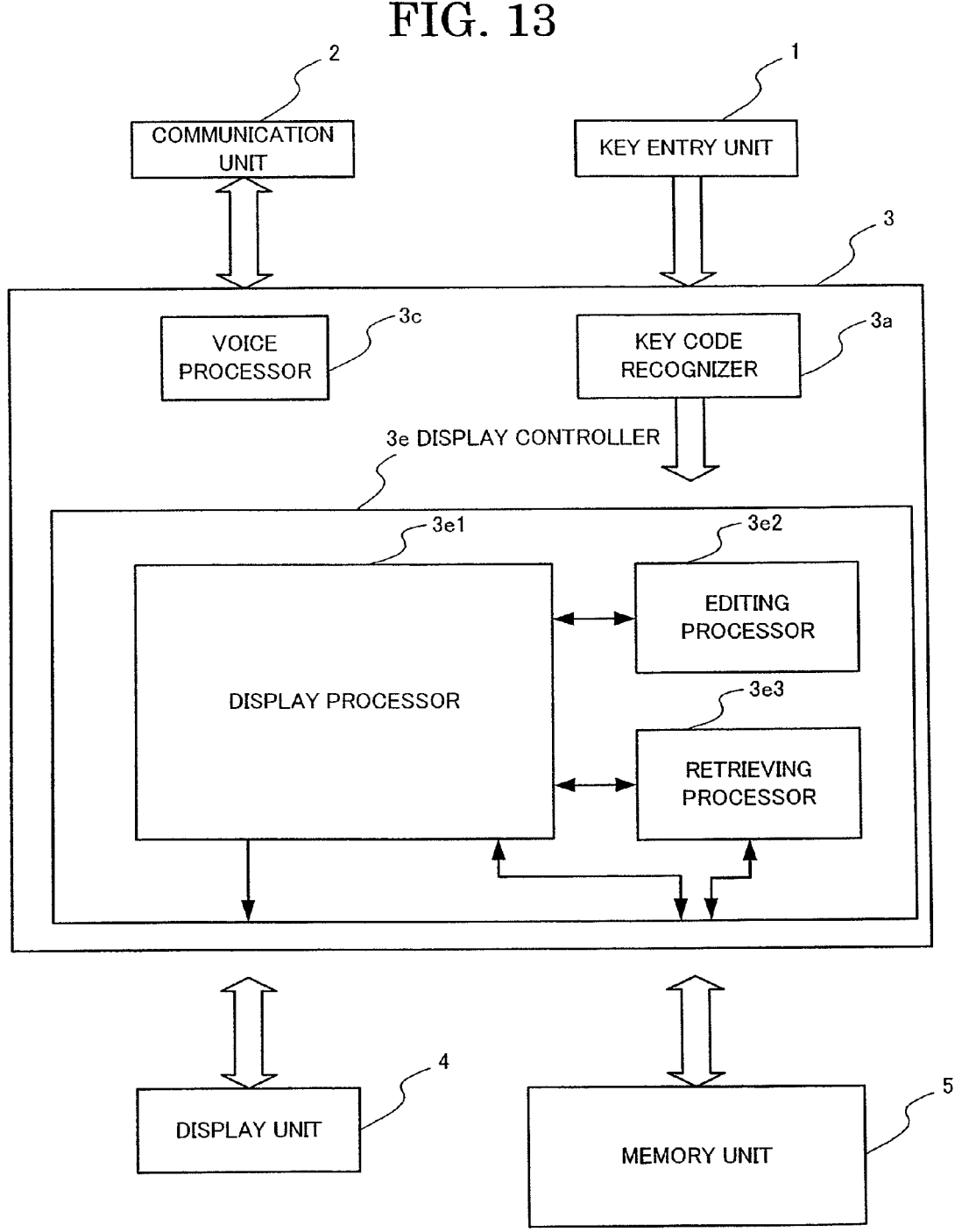
FIG. 13 is a functional block diagram showing a third embodiment of the present invention.

FIG. 13 is a block diagram showing the third embodiment of the present invention. The third embodiment of the present invention has the following construction and functions in addition to those of the first and second embodiments. That is, in this embodiment, the display controller 3e has a retrieving processor 3e3 in addition to a display processing part 3e1 and an editing processing part 3e2 like those in FIG. 7.

The retrieving processor 3e3 has a function provided in an interlocked relation to a user's key entry operation (i.e., depression of the ● key) to certify the change set-up of display data as shown in FIGS. 3 and 8. This function is to retrieve display data contained on a relevant display or the like. As a result of the retrieving, the retrieving processor 3e3 specifies any display containing the same display data retrieved for according to the display specifying data of the display, and informs it to the display processor 3e1.

Additionally, the retrieving processor 3e3 has a function of performing a data retrieving routine for display data after change by taking the data retrieving result for display data before change into consideration. In other words, in the display data retrieving routine, the retrieving processor 3e3 makes a duplication check of both of the display data before and after change.

Figure 14:
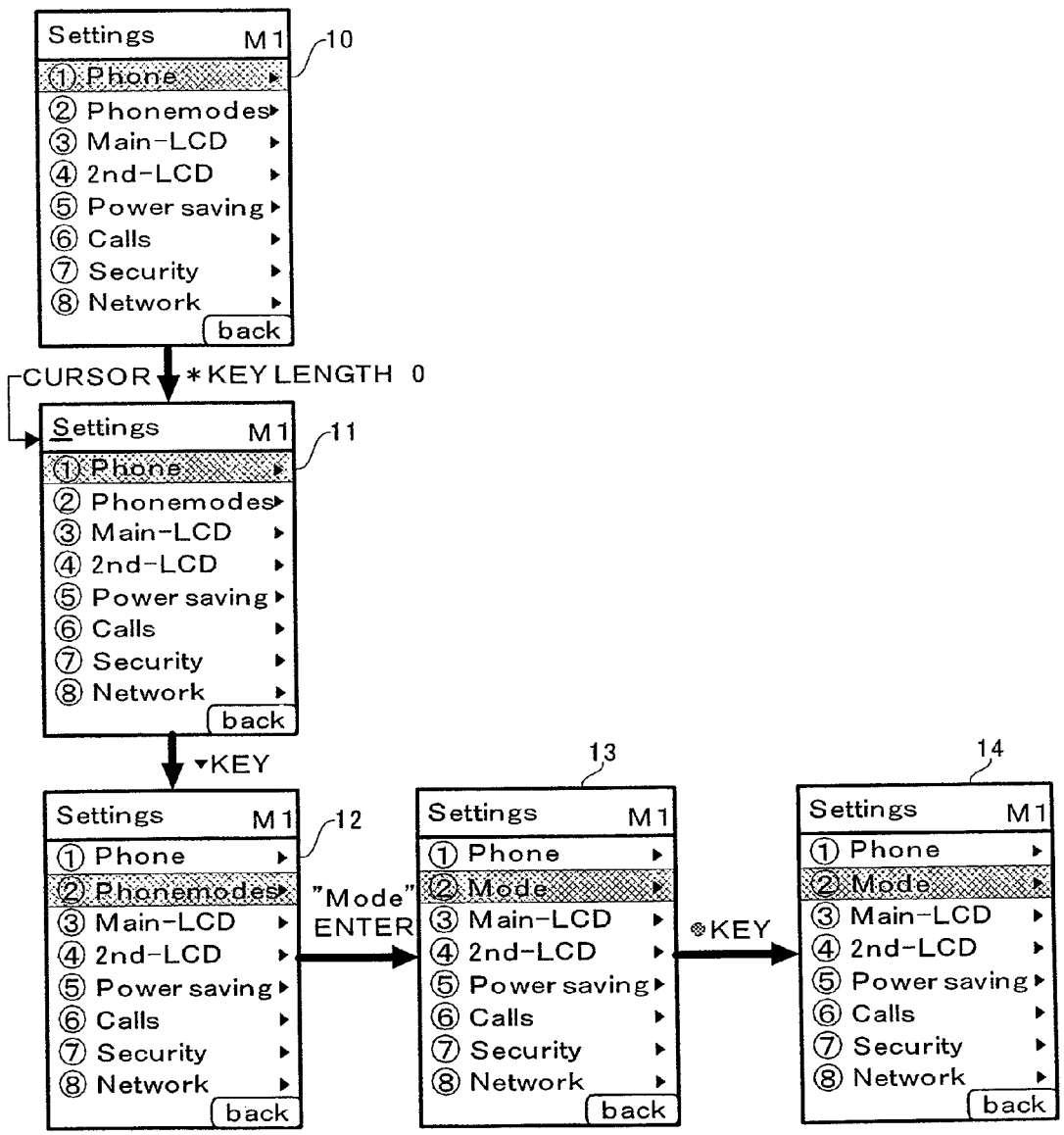
FIG. 14 shows an example of displays provided in the case that no duplication is present in non-changed and changed display data.
Figure 15:
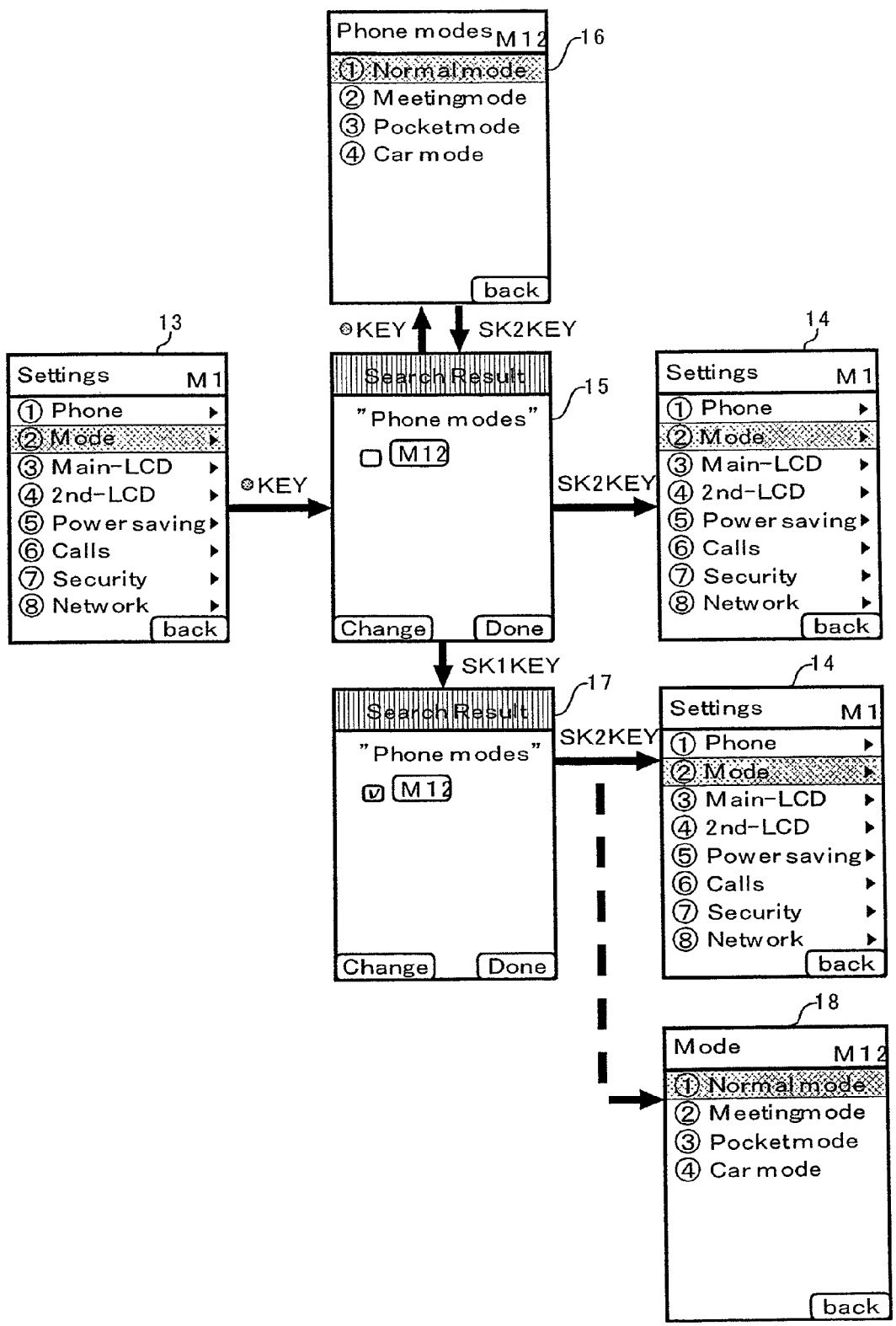
FIG. 15 shows an example of displays in the case that duplication is present in the display data before change while no duplication is present in the display data after change.
Figure 16:
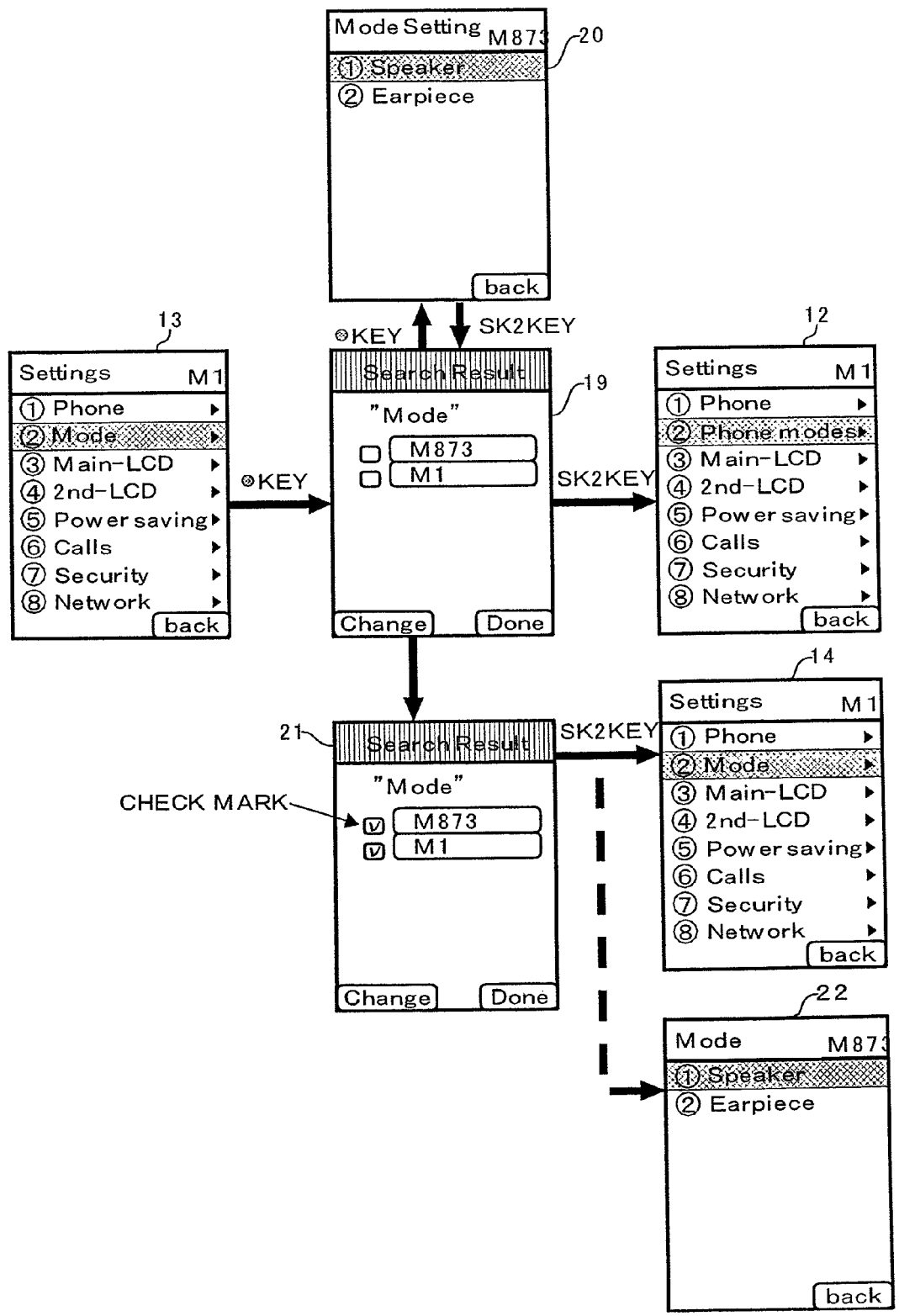
FIG. 16 shows an example of displays in the case that no duplication is present in present in the display data before change while duplication is present in the display data after change.

FIGS. 14 to 16 show examples of featuring practical displays in the third embodiment. Specifically, the Figures show display operation examples in the presence of duplicated display data found in the duplication check made at the time of changing editing subject display data. In the display data retrieving routine, performed are first duplication check of the display data before change and second duplication check of the display data after change.

Similarly to the second embodiment, as the duplication check in this example, the display data before change is checked with respect to the "Phone modes" and the display data after change is checked with respect to the "Mode".

Such change example is, for instance, a case that the term "Mode" is used in a large number of display items; that is, it is based on a user's desire to provide for unified single expression of the "Mode" for alleviating the difficulty in understanding.

FIG. 14 shows practical displays free from any duplication in the display data before and after change. In the third embodiment, performed are first duplication check of the display data before change and second duplication chick of the display data after change, but it is set that no retrieving result display appears before and after the change. The same is true with the editing displays (FIGS. 4 and 8) in the first and second embodiments.

FIG. 15 show practical displays in case of presence of duplication in the display data before change but no duplication in the display data after change. In this case, duplication is detected only in the duplication check of the display data before change, and it is set that no retrieving result display appears after the change. Thus, this is the same as in the case of the editing display (FIG. 9) in the second embodiment. In case of absence of duplication in the display data after change, by depressing the SK2 key under condition of display 15 or 17, the retrieving result display after change 19 (to be described later) does not appear, but the displays 14 and 18 or the display 16 remain, respectively.

FIG. 16 shows practical displays in case of absence of duplication in the display data before change and presence of duplication in the display data after change. In this case, duplication is detected only in the duplication check of the display data after change, and no retrieval result display before change 15 is displayed.

When it is found as a result of retrieving of the display data after change on the display 13 that display data containing the "Mode" is present on any other display, provided is the retrieving result display after change 19. The display 19 appears because of the fact that the display data after change on the display 10 of editing subject display specifying data "M1" contains the "Mode" and that the display 20 containing display specifying data "M873" (coming up by depressing, with the waiting display, the "Menu" key, the "8" key, the "7" key and the "3" key in this order) also contains the "Mode" as the "Mode editing". The display 19 thus indicates that both the display data including the "Mode" are extracted in the duplication check. In this example, no other duplications are shown for simplicity.

By confirming the content of the display 20 and depressing the SK2 key "Done" with the display 19, an operation with no display data substitution is possible as shown in the displays 12 and 20.

Also, with the display 21, it is possible to set substitution of "Mode" for both the displays of the "M873" and the "M1" and an operation of substituting display data for the "Mode" as shown in the displays 14 and 22 by depressing the SK2 key "Done".

Now, the operation routines in the third embodiment of the portable terminal and the display data editing method according to the present invention will be described with reference to flowcharts. The operation for initiating the data editing function in the third embodiment is the same as the one in the flow chart as shown in FIG. 4 for the first embodiment, and operations for the data editing and data entry functions are the same as those in FIGS. 10 and 11 for the second embodiment. Thus, these flowcharts (FIGS. 4, 10 and 11) will be used in the following description.

Figure 17:
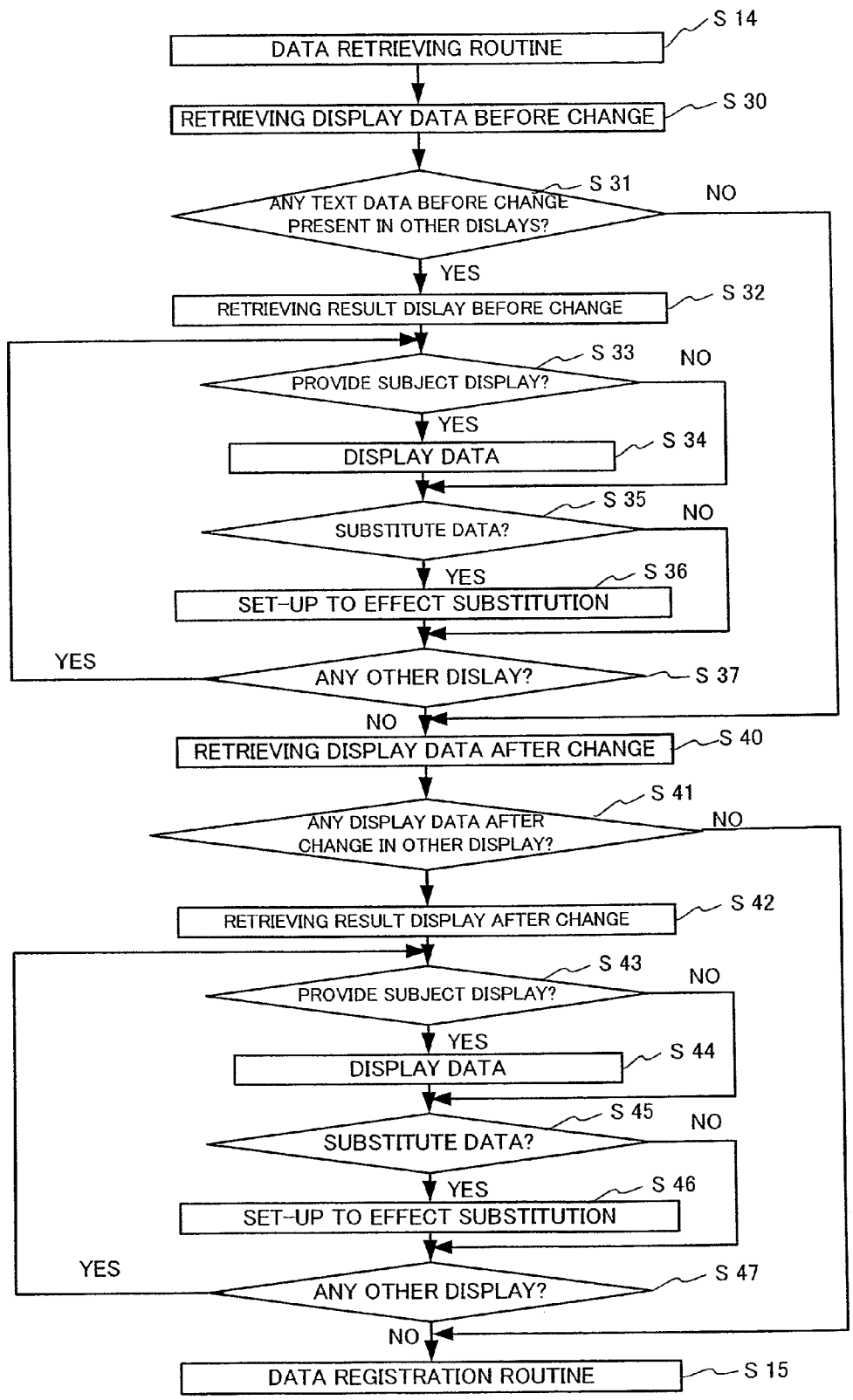
FIG. 17 is a flowchart illustrating a data retrieval and registration routine in the third embodiment.

FIG. 17 is a flowchart showing data retrieving and registration routines in the third embodiment.

In the data editing function start-up routine in the third embodiment, with a given display provided on the portable terminal (step S1 in FIG. 4), check is made to see if the * key for initiating the editing function is depressed for an extended time (step S2 in FIG. 4). If the * key is depressed for an extended time, check is made to see if the editing function has been started (step S3). If the editing function is in force, it is cancelled to terminate the routine (step S4 in FIG. 4), and the normal display is restored (step S1 in FIG. 4). If the editing function is not started yet, check is made to see if there is any display data on the display (step S5 in FIG. 4). If there is no display data, the normal display is restored (step S1 in FIG. 4). If there is any display data, it goes to the editing function routine in FIG. 10 (step S6 in FIG. 10).

In the data editing function routine as shown in FIG. 10, the editing function initial stage display such as the display 11 (FIG. 14) appears (step S10. The fact that the editing function is being started is shown by a cursor as in the display 11 (step S11 in FIG. 10). Similarly to the first and second embodiments, used is a cursor in a different color from that in the normal display. If the user selects display data that he/she likes to be edited by operating the ▲ or ▼ key, the cursor is shifted to the display data corresponding to the key operation (step S11 in FIG. 10). Read out is the font size or maximum input letter number subordinate to the display data with cursor like display 12 (FIG. 14) or display specifying data ("M1", "M12", etc.) (step S12 in FIG. 10). Then, it goes to the data entry routine as shown in FIG. 11 (step S13 in FIG. 10).

In the data entry routine (step 13 in FIG. 11), check is made to see if the * key for canceling the editing function is depressed for an extended time (step S20 in FIG. 11). If the * key is depressed for an extended time, the editing routine is terminated and the display 10 (FIG. 14) is restored. Otherwise, it goes to the character entry state (step S21 in FIG. 11). If characters are entered, they are displayed at the cursor position (step S22). Then, check is made to see if the entered characters are less than the maximum number (step S23 in FIG. 11). Unless otherwise the entered characters are less than the maximum number, the cursor is shifted by one character to the right of the entered characters (step S24 in FIG. 11). If the entered characters exceed the maximum number, check is made, without cursor shift, to see if the ● key for data registration is depressed as the next entry key (step S25 in FIG. 11). If the ● key is depressed, it goes to the data retrieving routine as shown in FIG. 12 (step S16 in FIG. 12).

In the data retrieving routine (FIG. 17), a retrieving routine for the data before change (step S30) is first executed, in which check is made to see if the display data before change is also used in any other display (step S31). If no such data is found, the display data before change is not duplicated, and executed in this case is only a data substitution routine based on the retrieving result for the display data after change.

If such data is used, as shown in FIG. 15, displayed is the retrieving result for display data before change 15 (step S32). By shifting the cursor to the "M12" on the display 15 (step S33) and depressing the ● key, the display 16 of "M12" can be provide for confirmation during editing (step S34). After confirming the display content on the display 16, the display 15 is restored. When changing, with the display 15, the data on the display 15 to the same "Mode" (step S35), the SK 1 key "Change" is depressed, whereby substitution can be effective. The display that is set is the data retrieval result set-up display 17 (FIG. 15) (step S36). If any other subject display is found on the display 17 (step S37), the display is likewise confirmed and set.

If data confirmation of all the retrieval result for display data before change has been completed, executed is the retrieving routine for the display data after change (step S40). Check is made to see if the display data after change "Mode" has been used in any other display as well (step S41). If such use has been found, provided is the retrieving result display after change 19 (step S42).

If such use is not been found, substitution for the entered "Mode" is made on the display 14 without provision of the display 19. If such use is found, provided is the retrieving result display after change 19 (step S42).

By shifting the cursor to the "M873" as shown on the display 19 (step S43) and depressing the ● key, it is possible to provide a pertinent display 20 (step S44). After confirming the display content on the display 20, the display 19 is restored. If changing the data on the display 20 likewise to the "Mode" as well (step S45), the SK1 key "Change" is depressed, to provide the retrieving result set-up display 21 with a check of marking the check box in front of the "M873" (step S46).

If any other subject display is found on the display 21 (step S47), the display is likewise confirmed and set. After checking all the retrieving results (step S47), the display data substitution is done according to the content set by depressing the SK2 key "Done" (step S15).

After termination of the data registering routine, execution goes back to the data editing function routine as shown in FIG. 10 for the next display data editing. Then, check is made to see if the * key is depressed for an extended time (step S15 in FIG. 10). In case of changing other display data or display data on any other display, it is possible to continue the editing routine. If it is detected in step S45 that the * key is depressed for an extended time, the editing routine is terminated and the display 10 is restored (step S4).

In the above operation routines, it is possible, with a given display, to collectively change the users desired display data together with the display data before change and after change as the duplicated display data contained in other displays.

It will be appreciated from the above description that when substituting the display data, duplication checks can be made of both data before change and after change. For data extracted in the retrieving routine for the data before change, a setup can be made to see if substitution to the same display data is to be done. If set-up of substitution is made, collective substitution can be done without execution of editing operation afresh with the same display. For data extracted in the retrieval routine for the data after change, a setting is made to see if new display data is to be entered fresh or substitution is to be done directly. By so doing, the user can readily substitute the user's own display data while confirming the content.

Although the above embodiments have been described in connection with display data changes within the portable display, it is possible to make following arrangements. After improving the ease of use by the display data on the desired display, the portable terminal can be connected to a personal computer for outputting data thereto. Also, it is possible to permit use of the same display data after change in other portable terminals or the like by transferring data thereto via IrDA, Bluetooth, etc.

Also, it is possible to arrange so as to permit securing of a memory area for preliminarily registered display data incapable of editing or registering as a memory unit of the portable terminal separately from the memory area for display data capable of editing and registering, thereby permitting restoration of a display of display data at the time of shipment with a resetting function of the portable terminal.

Furthermore, it is possible to arrange so that display changes in the portable terminal can be realized by receiving display data down-loaded from a server via internet. In this case, according to the invention it is very easily possible to arrange so that displays suited to the user or fitted to the user's tasted or interest even when the down-loaded display is of such display data as "exclusively for children excluding any Chinese characters", "local language versions for various districts", "exclusively for foreigners", etc.

The present invention is suitably applicable to a portable telephone set, a PHS (personal handy-phone system), a PDA (personal data assistance, personal digital assistance; personal portable data communication system), etc.

What is claimed is:

1. A portable terminal comprising:
   a display unit;
   a memory unit for storing first display data, first display data being a display item of a function set-up menu display;
   a key entry unit for entering second display data, the second display data being entered to change the first display data; and
   a display controller, wherein
   the display unit displays one display among a first plurality of displays and an editing display at any given time,
   the display controller comprises:
      a display processor for reading the first display data from the memory unit and displaying the editing display and the first plurality of displays on the display unit, the first plurality of displays being displayed as the function set-up menu display;
      an editing processor for changing the first display data selected from the first plurality of displays and displayed on the display unit to the second display data; and
      a retrieving processor for searching the memory unit and determining which of the first plurality of displays matches the second display data,
   the display processor provides a search result, and
   the search result contains display specifying data, the display data identifying one or more displays containing display data that matches the second display data.

2. A display data editing method for a portable terminal capable of providing a first plurality of displays to a display unit by reading out first display data stored in a memory unit, the method comprising:
   switching a current display of the first plurality of displays to an editing display;
   changing the first display data on the editing display and the first display data on the current display to a second display data entered from a key entry unit, the first display data being a display item in a function set-up menu display and the second display data being entered to change the first display data;
   storing the second display data in the memory unit,
   searching the memory unit to determine which of the first plurality of displays includes data that matches the second display data, and
   providing a search result display of the data display, the search result containing display specifying data, the display specifying data identifying one or more displays containing the data that matches the second display data,
   wherein said display unit displays only one display among the first plurality of displays and the editing display at any given time.

* * * * *